Patented Mar. 13, 1923.

1,447,973

UNITED STATES PATENT OFFICE.

WILLIAM FELDENHEIMER AND WALTER WILLIAM PLOWMAN, OF LONDON, ENGLAND.

TREATMENT OF CLAY.

No Drawing.     Application filed November 5, 1921.  Serial No. 513,116.

*To all whom it may concern:*

Be it known that we, WILLIAM FELDENHEIMER and WALTER WILLIAM PLOWMAN, both subjects of the King of England, and both residing at London, England, have invented certain new and useful Improvements in the Treatment of Clay, of which the following is a specification.

This invention is for improvements in and relating to the treatment of clay.

It is known to purify clay by suspending it in a liquid medium by aid of a peptizing agent, and after subsidence of the impurities to separate the purified clay substance, for example, by addition to the suspension of a suitable precipitant. The deflocculators hitherto commonly used will not, however, operate successfully with a number of clays, and in the case of others the difference between the minimum and maximum concentration of the deflocculator which will maintain the clay in proper suspension is too small for satisfactory working on the commercial scale.

It has now been found that by the use of a peptizing agent of the type hereinafter described, certain clays which are not amenable to treatment by the deflocculators commonly employed, or which demand comparatively close adjustment of the concentration of these reagents, can be successfully treated so as to be maintained sufficiently long in suspension to enable the clay substance to be satisfactorily separated from the impurities and recovered on the industrial scale.

According to this invention, a process for the treatment of clay in which the clay substance is deflocculated in a fluid medium, is characterized by effecting the deflocculation with the aid of an alkali resinate, or the equivalent thereof, for example, a resin acid in conjunction with an alkali or alkali salt which, with the acid, yields a water-soluble derivative. The term alkali resinate as used in this specification and claims includes such equivalents.

The preferred deflocculating reagent is a solution of ordinary rosin in caustic alkali, alkali silicate or carbonate.

The deflocculated clay may be recovered from its suspension in any known way.

The following are examples of deflocculating reagents according to this invention:

(A) 2 lbs. of commercial rosin are dissolved in a solution of 2 lbs. of caustic soda (98 per cent) in 140 lbs. of water at about 100°–120° F.

(B) 1 lb. of commercial rosin is dissolved in 4 lbs. of sodium silicate (140° Twaddell) in 140 lbs. of water.

These examples are given for illustrative purposes only and not by way of limitation, and it will be appreciated that the composition of the reagent utilized may be varied according to the nature of the clay to be treated, for, as previously indicated, a given deflocculator is not necessarily applicable with success to all clays; in fact it appears doubtful if any reagent can be asserted to be a deflocculator for clays in general. For example, we have found that the majority of clays from N. Carolina, Georgia and Florida may be successively suspended by aid of rosin dissolved in caustic alkali, suitable relative proportions being 6 lbs. of rosin and caustic soda (equal parts by weight of each) per ton of clay in 20 tons of soft water. As illustrative of the variation in the limit of concentration of this reagent, it may be mentioned that five times the quantity of the latter, namely 30 lbs. of rosin and caustic alkali (equal parts of each by weight) will successfully deflocculate the same weight of clay and water. For some individual clays, lower limits than these may be employed.

Clay from Gonnemaris (Cornwall), a clay presenting disadvantages in treatment by the known alkaline deflocculators, is another example of a clay which may be successfully brought into suspension by aid of rosin in caustic alkali.

On the other hand, some china clay from St. Remi, d'Amherst, Canada, cannot be satisfactorily treated with rosin in solution in caustic alkali. In this case, the solution of rosin in sodium silicate may be employed. For example, 750 lbs. of the clay in 15000 lbs. of soft water may be successfully brought into suspension by addition of 140 lbs. of solution (B) above. The same weight of clay and water can be equally effectively treated if the concentration of the deflocculating reagent be five times that given, namely 5 lbs. of rosin and 20 lbs. of sodium silicate.

It not infrequently happens in a clay mine that the nature of the clay varies in different parts of the bed. In such a case, it may be of advantage to use a mixture of the rosin dissolved in caustic alkali and the rosin dissolved in the alkali silicate, or sometimes it may prove advantageous to utilize a mixture of the rosin dissolved in these two solvents with rosin dissolved in alkali carbonate. Many of the beds of clay in the Bodmin Moor area are of this nature. Glyn Valley clay may also be treated by such mixtures of solutions.

The choice of the deflocculating reagent, the adjustment of its limits of concentration relative to the clay, and the time during which the clay suspension is allowed to stand before the clay substance is recovered, are factors readily determined by a simple laboratory trial.

In carrying the invention into effect in one way, the clay is washed by passing it over "mica"-drags in the usual manner, but instead of using water alone, a solution of rosin as above described is employed, of the appropriate composition and concentration demanded for the clay under treatment. A greater quantity of "mica" is deposited on the drags than is the case when water alone is employed, and the clay dispersion is then passed on to a settling-tank where it is left long enough for further deposition of "mica." From this tank the liquid carrying the clay in suspension is run into a depositing tank, in which the clay may be precipitated by the addition of any suitable precipitating agent, or otherwise recovered.

When precipitation is adopted, it is preferred to effect this in the manner described in U. S. Patent to Feldenheimer No. 1,324,958, of December 16, 1919.

There results from this treatment a very finely divided and highly purified clay adaptable to a variety of technical applications.

The rosin solution may be added at any desired stage, e. g. prior or subsequently to passing the suspension over the "mica"-drags.

If desired, the rosin solution may be added to the suspension prior to entry into the tank after the clay has been treated in the customary manner by passing over "mica"-drags, and after being left to stand in the tank for a sufficient period of time, the suspension may be then run into a second tank where the flocculator is added.

Obviously, the invention may be applied not only for purification, but also for the deflocculation for various purposes of an already purified clay.

We claim:—

1. In the treatment of clay, the step consisting in effecting deflocculation of the clay by admixing the latter with an aqueous solution of a resin in an alkaline solvent therefor.

2. In the treatment of clay, the step consisting in effecting deflocculation of the clay by admixing the latter with an aqueous solution of rosin in an alkaline solvent therefor.

3. In the treatment of clay, the step consisting in effecting deflocculation of the clay by admixing the latter with a solution of rosin dissolved in an aqueous solution of an alkaline silicate.

4. In the treatment of clay, the steps consisting in effecting deflocculation of the clay by admixing the latter with an aqueous solution of rosin in an alkaline solvent therefor, separating the suspension of clay substance from undeflocculated material, and recovering the clay from its suspension.

5. In the treatment of clay, the steps consisting in effecting deflocculation of the clay by admixing the latter with an aqueous solution of rosin in an alkaline solvent therefor, allowing undeflocculated material to separate by subsidence, separating the suspension of clay substance from the deposit, and recovering the clay from its suspension.

6. In the treatment of clay, the steps consisting in effecting deflocculation of the clay by admixing the latter with an aqueous solution of rosin in an alkaline solvent therefor, separating the suspension of clay substance from undeflocculated material, and precipitating the clay from its suspension by addition thereto of a flocculating reagent.

7. In the treatment of clay, the step consisting in admixing the clay with an aqueous solution of rosin in an alkaline solvent therefor in the proportion of substantially 3–15 lbs. of rosin per ton of clay.

8. In the treatment of clay, the steps consisting in preparing a substantially 5 per cent mixture of the clay with soft water, and incorporating with this mixture rosin and an alkaline solvent therefor in the proportion of substantially 3 to 15 lbs. of rosin per ton of clay.

9. In the treatment of clay, the steps consisting in preparing a substantially 5 per cent mixture of the clay with soft water, incorporating with this mixture rosin and an alkaline solvent therefor in the proportion of substantially 3–15 lbs. of rosin per ton of clay, allowing the mixture to stand, separating the suspension of clay substance from undeflocculated material, and separating the clay-substance from its suspension.

In testimony whereof we have signed our names to this specification.

WILLIAM FELDENHEIMER.
WALTER WILLIAM PLOWMAN.